United States Patent [19]

Johnson

[11] 4,191,462

[45] Mar. 4, 1980

[54] FIXED FOCUS EXPOSURE CONTROL APPARATUS WITH REVERSE SPHERICAL ABERRATION CORRECTIVE CHARACTERISTIC

[75] Inventor: Bruce K. Johnson, Andover, Mass.

[73] Assignee: Polaroid Corporation, Cambridge, Mass.

[21] Appl. No.: 899,270

[22] Filed: Apr. 24, 1978

[51] Int. Cl.² .......................... G03B 3/04; G03B 15/03
[52] U.S. Cl. ...................................... 354/139; 354/25; 354/196
[58] Field of Search ............... 350/188, 189, 191, 194, 350/197, 205, 206, 230; 354/195, 196, 25, 163, 230, 232, 198, 139; 352/139–141

[56] References Cited

U.S. PATENT DOCUMENTS

| | | |
|---|---|---|
| 1,333,304 | 3/1920 | Gage et al. ................... 350/188 UX |
| 2,759,393 | 8/1956 | McLeod .......................... 350/194 X |
| 2,811,081 | 10/1957 | Praeger ............................ 354/195 X |
| 2,821,108 | 1/1958 | Warmisham et al. ................ 350/197 |
| 3,035,489 | 5/1962 | Simons ............................. 354/195 X |
| 3,389,633 | 6/1968 | Vanderhooft ........................ 354/112 |
| 3,618,499 | 11/1971 | Harvey ............................. 354/196 X |
| 3,987,470 | 10/1976 | Nesson et al. ........................ 354/196 |
| 4,064,520 | 12/1977 | Freudenschuss et al. ........... 354/196 |
| 4,103,309 | 7/1978 | Massa ............................... 352/140 X |
| 4,104,653 | 8/1978 | Johnson et al. .................. 354/230 X |

FOREIGN PATENT DOCUMENTS 231028 3/1925 United Kingdom ...................... 350/188

OTHER PUBLICATIONS

Cox, A. *Optics–The Technique of Definition*, Focal Press, London & N.Y., 11th Ed., 1956, pp. 66 & 103–106.
U.S. Patent Application Ser. No. 839,839, "Sonar Controlled Two Focal Position Lens System", by B. Johnson, filed 10/6/77.

*Primary Examiner*—John Gonzales
*Attorney, Agent, or Firm*—Edward S. Roman

[57] ABSTRACT

An improved lens arrangement is provided for use in a camera of the type having a focal plane and a subject-to-camera distance responsive effective maximum aperture limiting control arrangement operatively disposed with respect to the focal plane. The improved lens arrangement has a reverse spherical aberration corrective characteristic which operates to reduce the effective circles of confusion associated with each of the images of different subjects within a given range of distances from the camera as formed at the focal plane by the lens arrangement in combination with the effective aperture control arrangement.

14 Claims, 12 Drawing Figures

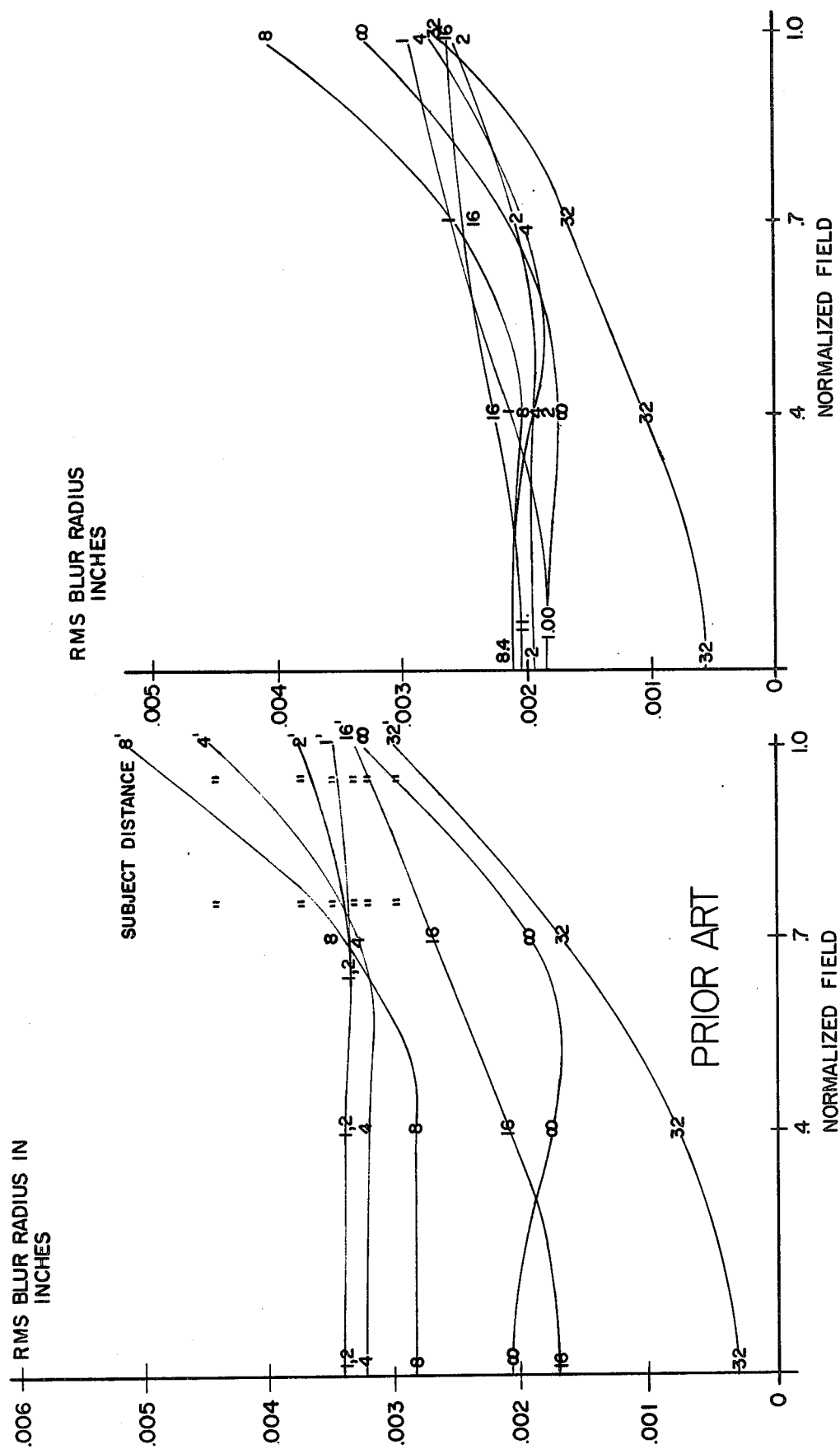

FIXED FOCUS EXPOSURE CONTROL APPARATUS WITH REVERSE SPHERICAL ABERRATION CORRECTIVE CHARACTERISTIC

BACKGROUND OF THE INVENTION

1. Field of the Invention

This invention relates generally to a fixed focus exposure control apparatus having a reverse spherical aberration corrective characteristic, and more particularly to, a fixed focus exposure control apparatus having a range responsive maximum effective aperture limiting shutter arrangement together with a reverse sperical aberration correcting lens for automatically maintaining a subject to be photographed at the forefront of its depth of the field.

2. Description of the Prior Art

Today there is a substantially large mass market for relatively low-cost cameras having automatic ranging systems. One camera of this type is commonly marketed by the Polaroid Corporation under the trade name "One-Step". This camera embodies a "scanning type" shutter blade arrangement used in conjunction with a fixed focus objective lens to provide a camera which is simple to operate. The camera also utilizes film units of the self-prossessable type which are automatically processed and ejected from the camera by way of a motorized drive mechanism. Thus, the photographer need only depress a single button to effect both the exposure and processing of the film units. Such cameras are generally focused for a fixed distance forward of the objective lens, as for example seven feet, so as to provide a maximum depth of field throughout an extended subject range. However, since the camera is fixedly focused at a determinate distance, the blur radius is at a minimum for photographic subjects located at the determinate focus distance and progressively increases as the subject is moved away from the determinate distance to which the lens is focused. Although the change in blur radius with camera-to-subject distance may not be readily apparent to the amateur photographer, it is obviously advantageous to minimize this change without sacrificing the simplicity adherent to a fixed focus objective lens.

Therefore, it is a primary object of this invention to provide a simple fixed focus camera wherein the blur radius is effectively minimized for photographic subjects located within a determinate camera-to-subject distance range extending from distances immediately adjacent the objective lens to infinity.

It is a further object of this invention to provide a fixed focus exposure control apparatus having a range responsive maximum effective aperture control shutter arrangement together with a lens arrangement embodying a reverse spherical aberration corrective characteristic which collectively operate to maintain the subject at the forefront of the depth of the field regardless of its actual distance from the camera.

Other objects of the invention will be in part obvious and will in part appear hereinafter. The invention accordingly comprises the mechanism and system possessing the construction, combination of elements and arrangement of parts which are exemplified in the following detailed disclosure.

SUMMARY OF THE INVENTION

A camera of the type having means for defining a focal plane and an effective aperture control arrangement operatively disposed with respect to the focal plane, is provided with an improved lens arrangement operatively disposed with respect to the effective aperture control arrangement and fixedly positioned with respect to the focal plane during different exposure operations in which image forming light rays from subjects, located at different specific locations within a given range of distances from the camera, are at different times respectively focused at the focal plane. The lens arrangement is configured to include a reverse spherical aberration corrective characteristic which is effective to substantially reduce the average size of the effective circle of confusion associated with each of the images of the different subjects formed at the focal plane by the lens arrangement in combination with the effective aperture control arrangement. The effective aperture control arrangement preferrably includes a shutter arrangement of the type capable of selectively providing different maximum effective aperture sizes for different exposure operations. Means are also provided for varying the maximum aperture size for different exposure operations as a function of camera-to-subject distance so that the size of the maximum effective aperture increase as the camera-to-subject distance increases.

BRIEF DESCRIPTION OF THE DRAWINGS

The normal features that are considered characteristic of the invention are set forth with particularity in the appended claims. The invention itself, however, both as to its organization and its method of operation, together with other objects and advantages thereof, will be best understood from the following description of the illustrative embodiment which, when read in connection with the accompanying drawings, wherein like members have been employed in the different figures denote the same parts and wherein:

FIG. 1A is a diagramatic representation of the blur radius at a particular focal plane for the arrangement of FIG. 1;

FIG. 1B is a diagrammatic representation of the blur radius at another focal plane for the arrangement of FIG. 1;

FIG. 4 is a graphical representation showing the variation in RMS blur radius vs. normalized field for a prior art lens arrangement as a function of subject-to-camera distance;

FIG. 5 is a graphical representation of RMS blur radius vs. normalized field for the exposure control arrangement of FIG. 1 as a function of subject-to-camera distance;

DESCRIPTION OF THE PREFERRED EMBODIMENT

Figure 1:
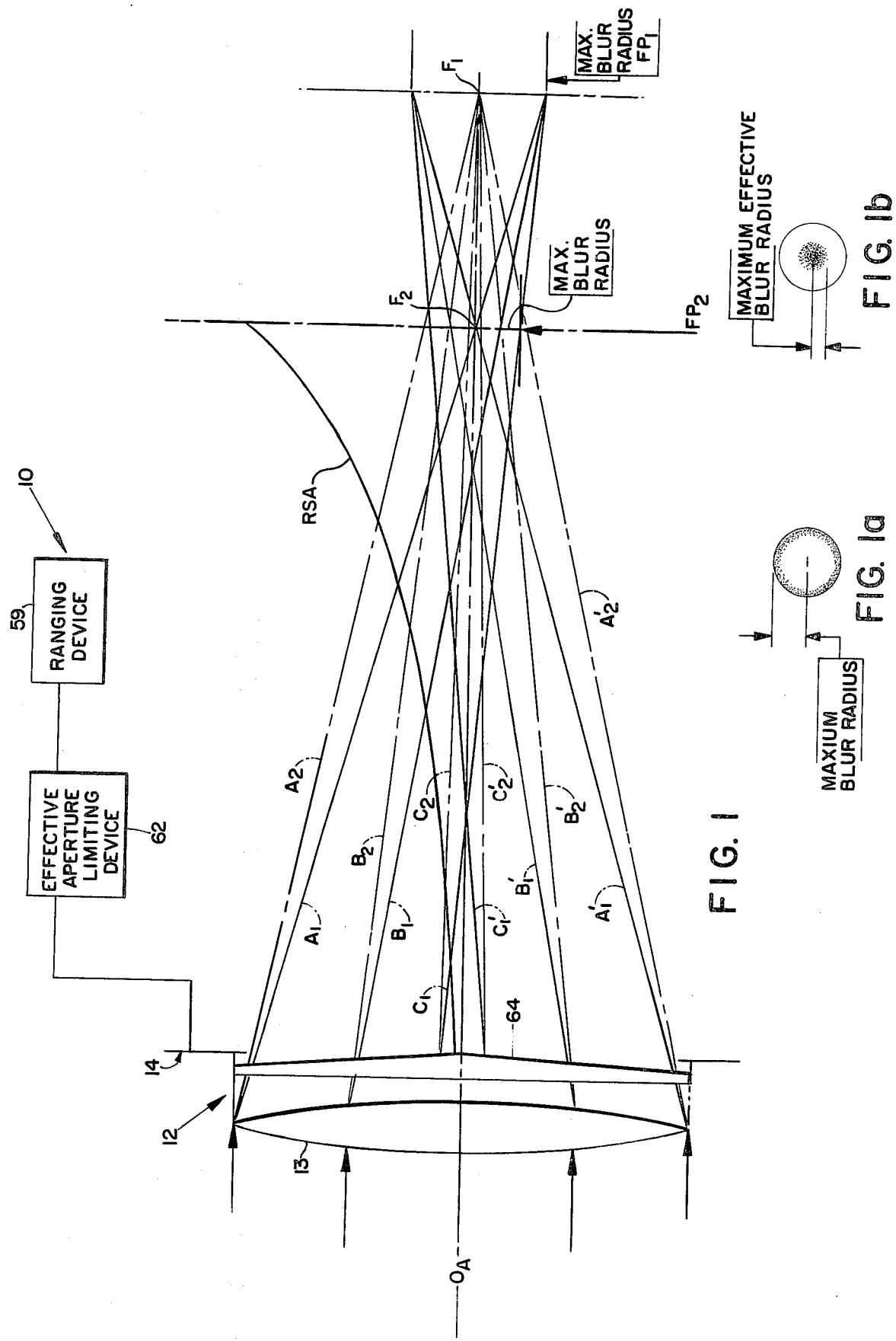
FIG. 1 is a side elevational view in schematic form for the exposure control arrangement of this invention.
Figure 3:
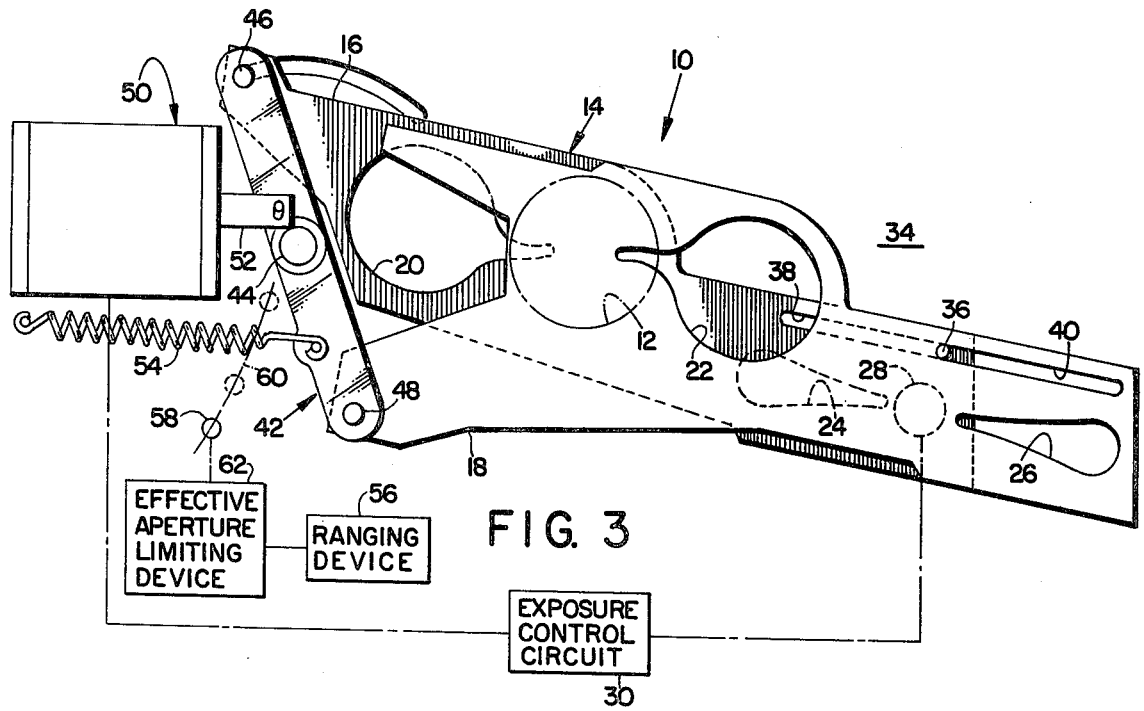
FIG. 3 is a front elevational view of the shutter blade mechanism portion of the exposure control arrangement of FIG. 1.

Referring now to FIGS. 1 and 3, there is shown generally at 10 a photographic film exposure arrangement which may be utilized in conventional cameras including those of the instant processing type as manufactured and sold by the Polaroid Corporation. The film exposure arrangement 10 comprises a lens arrangement 12 as shown centrally disposed about an optical axis $O_A$. The lens arrangement 12 includes an objective lens 13 preferably fixedly focused at or near infinity. The objective lens 13 may be of any conventional design such as a single element landscape lens or a three element triplet lens. Although the objective lens 13 is described as having a near infinity focus, it will be understood that the near infinity focus may be as short as 32 feet.

The photographic film exposure arrangement 10 further includes an effective aperture control arrangement comprising a shutter blade mechanism arrangement as shown generally at 14 and preferably comprising a pair of "scanning type" shutter blade elements 16 and 18 as may be best seen in FIG. 3 and as is more particularly described in U.S. Pat. No. 3,942,183, entitled "Camera with Pivoting Blades", by G. Whiteside, issued Mar. 2, 1976. Although "scanning type" shutter blade elements are preferred, other types of shutter blade arrangements which have means for controlling the maximum aperture in correspondence to subject distance as will be subsequently described may also be utilzied. The shutter blade elements 16 and 18 are provided respectively with scene light admitting primary apertures 20 and 22 which operate to collectively define a progressive variation of effective aperture openings in accordance with longitudinal and lateral displacement of one blade element with respect to the other blade element as will be subsequently described herein. The apertures 20 and 22 are selectively shaped so as to overlap each other and thereby define a gradually varying effective aperture size as a function of the position of the blades 16 and 18.

Each of the blades 16 and 18 may additionally be configured to have corresponding photocell sweep secondary apertures shown respectively at 24 and 26. Secondary apertures 24 and 26 may be configured in correspondence with the shape of scene light admitting primary apertures 20 and 22. As is readily apparent, secondary apertures 24 and 26 move in correspondence with the primary apertures 22 and 24 to define a small secondary effective aperture for admitting the passage of scene light on the scene to be photographed to a light detecting station comprising a photo-responsive element as shown generally at 28.

The photo-responsive element 28 may provide an output signal to an exposure control circuit 30 which may include a well-known light integrating circuit to provide an output signal to terminate an exposure interval as a function of the amount of light received through the secondary aperture, as defined by the overlapping photocell sweep apertures 24 and 26, in a manner to be subsequently described in greater detail. An exposure control system embodying the above-described light detecting station and control circuit is described in more detail in U.S. Pat. No. 3,641,889 entitled "Exposure Control System" by V. Eloranto. Means are provided for mounting the blade mechanism 14 for displacement between at least one scene light blocking arrangement as shown in FIG. 3 precluding transmission of scene light to a rearwardly located focal or film plane $FP_2$ and a scene light unblocking arrangement defining a maximum aperture value for allowing the transmission of scene light from the lens arrangement 12 to the focal plane $FP_2$ as shown in FIG. 1. Such mounting means preferably comprises a baseblock as shown generally at 34 from which extends a pivot pin or stud 36 for pivotally and translatably engaging elongated slots 38 and 40 formed in shutter blade elements 16 and 18 respectively. Pin 36 may be integrally formed with the baseblock 34 and blade elements 16 and 18 may be retained in engaging relation with respect to the pin 36 by any suitable means such as peening over the outside of the pin 36.

The opposite ends of the blade element 16 and 18 respectively include extended portions which pivotally connect to a walking beam 42. The walking beam 42, in turn, is disposed for rotation relative to the baseblock 34 by pivotal connection to a projecting pivot pin or stud 44 which may also be integrally formed to the baseblock 34. The walking beam 42 may be pivotally retained relative to the pin 44 by any conventional means such as an E ring. In a preferred mode, the walking beam 42 is pivotally connected at its distal ends to the shutter blade elements 16 and 18 by respective pin members 46 and 48 which extend from the walking beam 42.

A tractive electromagnetic device in the form of a solenoid 50 is employed to displace shutter blades 16 and 18 with respect to each other and the base block 34. The solenoid 50 is of conventional design having an internally disposed cylindrical plunger 52 which retracts inwardly into the body of the solenoid upon energization thereof. The solenoid plunger 52 is affixed to the walking beam 42 by means of a pivot pin or stud such that longitudinal displacement of the plunger 52 will operate to rotate the walking beam around its pivot pin 44 so as to appropriately displace the shutter blades 16 and 18.

Figure 2:
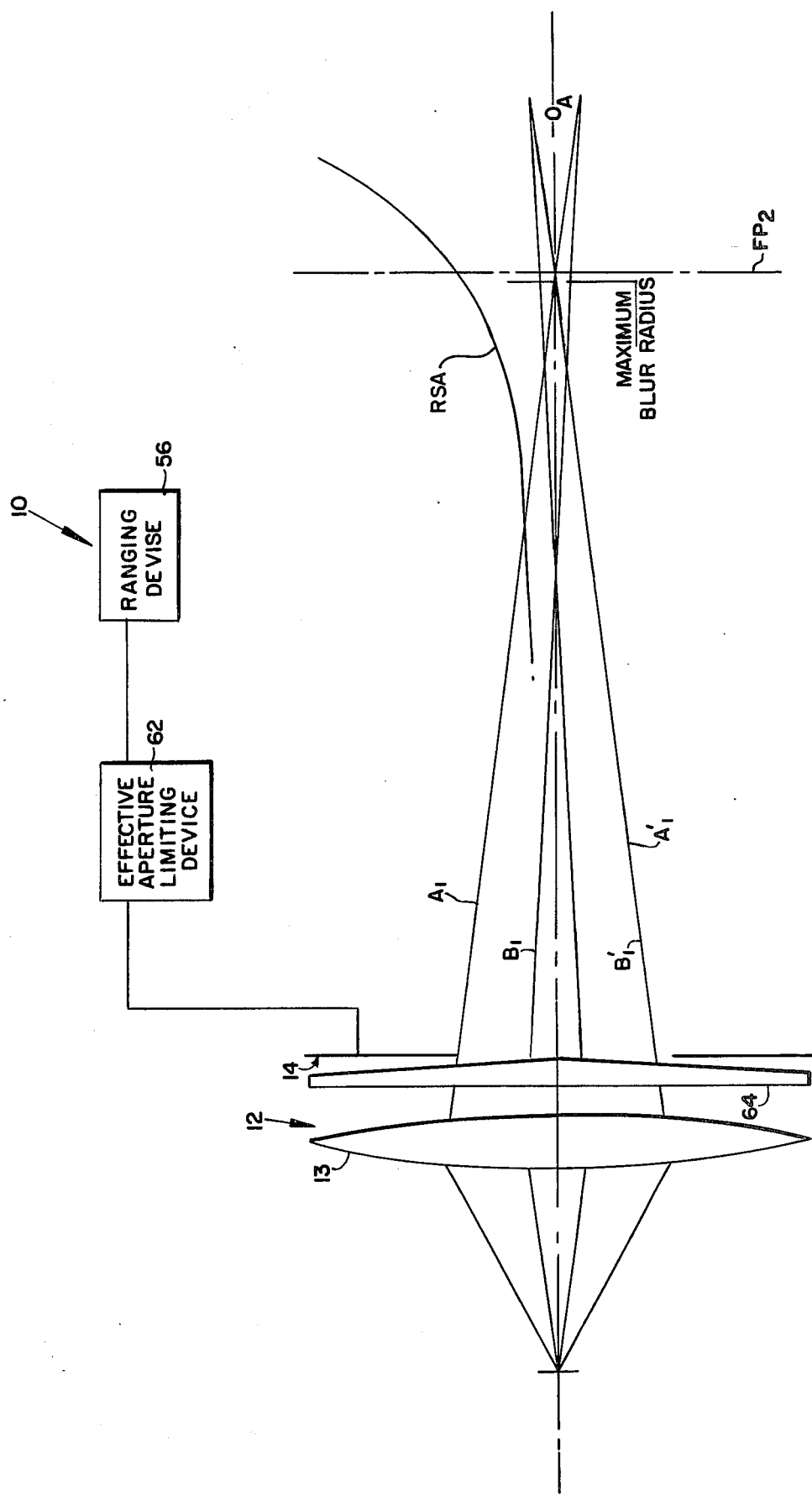
FIG. 2 is a schematic side elevational view showing another mode of operation for the exposure control arrangement of FIG. 1.

The baseblock 34 may be arranged to support the solenoid 50 in a position just above a biasing tension spring 54 which operates to continuously urge the blade elements 16 and 18 to move into the position defining their maximum aperture value. The movable end of the tension spring 54 connects to the walking beam 42 while its opposite stationary end is grounded with respect to the base block 34. Thus, with the spring connection herein described, the shutter blade mechanism 14 is biased to move into its scene light unblocking arrangement as shown in FIG. 1 and the shutter blades 16 and 18 are drawn to their closed position as shown in FIG. 2 only when the solenoid 50 is energized. Thus, a photographic exposure cycle may be commenced upon depression of a shutter button (not shown) whereupon tension spring 54 operates to rotate the walking beam 42 in a clockwise direction as viewed in FIG. 3 to move the shutter blade elements 14 and 16 in directions which operate to progressively enlarge their aperture values thereby defining the range of progressively increasing sized aperture values. As will be readily appreciated, the rotation of walking beam 42 about pivot pin 44 effects simultaneous linear and angular displacement of shutter blade elements 16 and 14 about pivot pin 36. Simultaneously, the secondary photocell sweep apertures 24 and 26 define a corresponding progressively enlarging secondary aperture opening over the photoresponsive element 28.

The exposure control apparatus 10 of this invention can be operated in conjunction with a flash or transient source of artificial illumination and the aforementioned aperture control arrangement may further include means for determining a maximum effective aperture value from the aforementioned range of progressively increasing sized apertures as a function of the level of illumination anticipated at the particular scene being photographed. The anticipated level of artificial illumination for any scene may be correlated to the camera-to-photographic subject distance in view of the inverse square law of light energy propagation which holds that the light energy available from a given source varies inversely with the square of the distance from that source. Accordingly, the camera-to-photographic subject distance must first be determined and the value of this distance can be utilized to determine a maximum effective aperture value or size from the aforementioned range of progressively increasing sized apertures.

Toward this end, there may be provided a ranging device shown generally at 56 comprising a conventional optical rangefinder wherein the photographer views the object to be photographed and mechanically moves an arm (not shown) until the object is in proper focus. The ranging device 56 in cooperation with an aperture limiting device 62 can provide a mechanical output corresponding to the determined camera-to-photographic subject distance to appropriately displace an interceptor pin 58 about a locus of travel as shown by the phantom line 60 to intercept the edge of the walking beam 42 and thereby determine a maximum effective aperture value from the range of progressively increasing sized aperture values in correspondence with the determined camera-to-photographic subject distance. The interceptor pin 58 may be moved to intercept the edge of the walking beam 42 in a well-known manner as more fully described in U.S. Pat. No. 3,972,057 entitled "Exposure Control System with Follow Focus Capability", by G. Whiteside, issued July 27, 1976 in common assignment herewith. Thus, as is readily apparent, the walking beam 42 may be intercepted by the pin 58 at various locations coinciding to various maximum effective apertures where the size of each of the maximum effective apertures increases as the distance of the camera or objective lens-to-photographic subject increases.

Thus, the shutter arrangement is capable of selectively providing different maximum effective aperture sizes during different exposure operations and includes means for varying the maximum effective aperture size for different exposure operations as a function of camera-to-subject distances so that the sizes of the maximum effective apertures increase as the camera-to-subject distance increases.

Referring back to FIG. 1, there is shown a lens element 64 disposed in closely spaced apart relation adjacent to the blade mechanism 14 so as to overlap the aforementioned range of progressively increasing sized aperture values. At least one side of the lens element 64 is structured and arranged to define a generally conical surface centered about the optical axes $O_A$. The lens element 64 operates in cooperation with the blade mechanism 14 and its associated range responsive aperture limiting apparatus to cause an overall reduction in the RMS blur radius or effective circles of confusion associated with each of the images projected on the focal plane $FP_2$ for any photographic subject located within a range extending from close proximity to the objective lens 13 to infinity as will be subsequently described. Referring now to FIG. 1, the phantom lines $A_2$, $B_2$, $C_2$ and $A_2'$, $B_2'$, $C_2'$ represent image rays as would otherwise be focused by the objective lens 13 by itself, without the lens 64 for a photographic subject located at or near infinity. As is readily apparent, all the phantom line rays focus at the same point $F_1$ on the optical axis $O_A$ thereby indicating that the objective lens 13 is perfectly corrected for spherical aberration. In practice, however, such a perfect correction would be unlikely, and the phantom line rays would likely focus at different points along the optical axis as a result of the spherical aberrations of the objective lens 13. Thus, without the lens 64, a focused image for a subject located at or near infinity could be projected on a focal plane as shown at $FP_1$ in a well-known manner. If the photographic subject is moved progressively closer to the objective lens 13, however, the focal point $F_1$ also moves progressively along the optical axis $O_A$ to corresponding locations behind the plane $FP_1$. Thus, for different exposure operations, the photographer must refocus the objective lens 13 in order to maintain a focused image at the focal plane $FP_1$ for subjects located at specific locations within a given range of distances from the camera. Inclusion of the lens 64, however, allows the photographer to conduct different exposure operations without refocusing by providing the exposure arrangement 10 with a reverse spherical aberration corrective characteristic which operates to focus image forming light rays from subjects located at different specific locations within a given range of distances from the camera at different times respectively at the focal plane $FP_2$ in a manner as will now be more fully explained.

The solid line image rays $A_1$, $B_1$, $C_1$ and $A_1'$, $B_1'$, $C_1'$ represent image rays that are refracted by the conical lens 64 for the same photographic subject located at or near infinity. As is readily apparent, each solid line ray $A_1$, $B_1$, $C_1$ and $A_1'$, $B_1'$, $C_1'$ diverges from the direction along which it would otherwise be projected absent the lens 64 (corresponding phantom line ray) so as to converge upon the optical axis $O_A$ at locations forward of the focal plane $FP_1$. With the aperture set at its maximum effective value in correspondence with a near infinite camera-to-subject distance, it can be seen that the outermost rays $A_1$, $A_1'$ (those rays furthest from the optical axis $O_A$ at the lens arrangement 12) converge on the optical axis $O_A$ at a point $F_2$. The focal plane can now be moved forward to coincide with the point of intersection $F_2$, as shown at $FP_2$. The maximum blur radius for an image projected on the focal plane $FP_2$ is determined by the distance from the optical axis $O_A$ to the concentric locus of intersection of the rays C, C', nearest the optical axis $O_A$, with the focal plane $FP_2$, Thus, the maximum blur radius or circle of confusion at the focal plane $FP_2$ does not differ substantially from the maximum blur radius at the focal plane $FP_1$ as diagramatically shown by the circles of confusion in FIGS. 1B and 1A respectively.

The character of the circle of confusion for images projected on the focal plane $FP_2$ as shown in FIG. 1B, however, is entirely different from the character of the circle of confusion for images projected on the focal plane $FP_1$ as shown in FIG. 1A. As is readily apparent, substantially all the rays A, B, C and A', B', C' strike the focal plane $FP_1$ in an annular locus of intersection around the optical axis $O_A$ as indicated by the darkly shaded portion of FIG. 1A while the majority of the rays strike the focal plane $FP_2$ at or near the optical axis as indicated by the darkly shaded portion of FIG. 1B. Thus, the maximum effective blur radius which extends only to the edge of the darkly shaded portion is substantially smaller than the actual maximum blur radius for images projected on the focal plane $FP_2$ in contrast with images projected on the focal plane $FP_1$ where the maximum effective blur radius is as large as the actual maximum blur radius. Images projected on the focal plane $FP_2$ would therefore appear to be subbstantially clearer than images projected onto the focal plane $FP_1$ and can actually be maintained within a desirable effective circle of confusion of 0.005" for photographic subjects moved from infinity to ten feet of the objective lens 13.

Referring now to FIG. 2, there is diagramatically illustrated the situation where the photographic subject is moved substantially closer to the objective lens 13 and the maximum effective aperture value is correspondingly reduced. Again, the outermost rays $A_1$, $A_1'$ (those rays furthest from the optical axis $O_A$ at the lens arrangement 12) intersect the optical axis $O_A$ at the focal plane $FP_2$ and contribute the majority of the rays which determine the maximum effective blur radius as previously described. In this manner, images projected on the focal plane $FP_2$ for subjects close to the objective lens 12 can be maintained within the aforementioned 0.005" circle of confusion.

The lens element 64 operates to refract rays so that the distance from the lens 64 at which the outermost rays furthest from the optical axis $O_A$ ultimately intersect the optical axis $O_A$ progressively decreases in correspondence with progressively decreasing aperture values and subject-to-camera distances. Thus, the lens arrangement 12 is provided with a reverse spherical aberration corrective characteristic as is graphically shown by the curve RSA in FIGS. 1 and 2 plotted as a function of changing aperture sizes vs. changing points of ray intersection along the optical axis $O_A$. As photographic subjects are progressively moved closer to the objective lens 13, and the maximum aperture sizes are correspondingly reduced, the reverse spherical aberration corrective characteristic introduced by the lens element 64 operates to move the points of intersection of the outermost rays with the optical axis $O_A$ in a direction toward the lens 64, thereby cancelling the normal effect of the objective lens 13 to image the same points of ray intersection along the optical axis in a direction away from the lens 64. Therefore, the points of outermost ray intersection along the optical axis $O_A$ remain unchanged on the focal plane $FP_2$ regardless of the subject-to-camera distance within a given range of distances. In this manner, the reverse spherical aberration corrective characteristic operates to sustantially reduce the average size of the effective circles of confusion associated with each of the images of different photographic subjects as formed at the focal plane $FP_2$ by the lens arrangement 12 in combination with the aperture control arrangement.

The effective aperture control arrangement and lens arrangement herein described is also a substantially hyperfocal film exposure arrangement for all exposure operations associated with subjects located at different specific locations within the given range of distances from the camera since each focused subject, regardless of its position in the range, resides at substantially the forefront of the depth of field or, in other words, one half hyperfocal distance from the camera.

Referring now to FIG. 4, there is shown a graphical representation (prior art) of the variation in RMS blur radius in inches over a normalized focal plane field for photographic subjects located at various distances from the camera from one foot to infinity without the aforementioned lens element 64. Each curve represents a particular camera-to-subject distance and is so designated. The objective lens 13 is a well-known plastic triplet of the type as now utilized in Polaroid's Pronto-type cameras. The triplet has a fixed focal length of thirty-two feet and the maximum effective aperture value was varied in correspondence with camera-to-subject distance as previously described. Thus, for subjects located at infinity, thirty-two feet and sixteen feet, the maximum effective aperture value is F/9.5, while for a photographic subject located at a distance of eight feet, the maximum effective aperture value is F/19 and for a photographic subject located at a distance of four feet, the maximum effective aperture is F/38, etc. Referring now to FIG. 5 for comparison with FIG. 4, there is shown a variation in RMS blur radius in inches over the normalized focal plane field of the exposure control system of FIG. 4 with the exception that the conical lens element 64 is now stationed closely adjacent to the shutter blade mechanism and the focal distance for the triplet has been changed to infinity. As is now readily apparent by comparing the graphs of FIG. 5 with those of FIG. 4, an overall reduction in the RMS blur is achieved for photographic subjects located at each measured distance from the camera from one foot to infinity by the addition of the conical lens 64.

Figure 6:
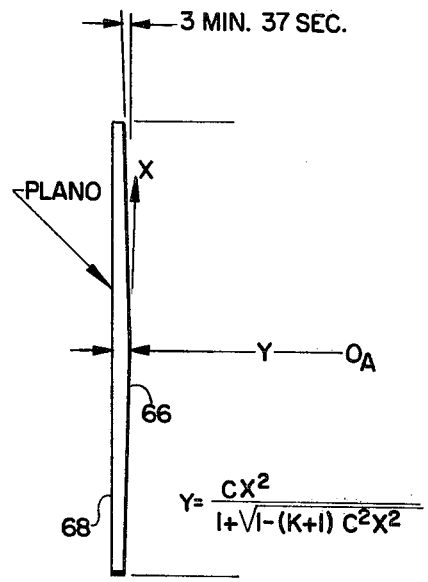
FIG. 6 is a side elevational view of a portion of the exposure control arrangement of FIG. 1.

Referring now to FIG. 6, there is shown one preferred embodiment for the conical lens element 64 wherein the conical surface 66 is determined by the illustrated equation as graphed along the illustrated X and Y axis with the constant C equalling $-1. \times 10^8$ and the constant K equalling $-9. \times 10^5$. The conical surface 66 generated by the aforementioned equation has a slope of three minutes and thirty-seven seconds with respect to a plane intersecting the X axis and perpendicular to the Y axis. The other surface 68 of the lens element 64 is generally planar and is spaced at 0.025 inches from the apex of the conical surface along the optical axis $O_A$. This spacing dimension is not critical and may be varied in accordance with other design criteria. The lens element 64 may be made of any suitable transparent optical material such as glass or plastic of which Methyl Methacrylate was utilized for the above described example. Although the surface 66 has been described as generally conical and the opposed surface 68 has been described as being generally planar, it will be generally understood that either surface may include slight aspheric deviations to compensate for sperical aberrations of the lens system in a manner which is well known in the art. In addition, it will be understood that the surfaces 68 or 66 may alternatively be slightly convex or slightly concave to modify the power associated with the lens element 64.

Figure 7:
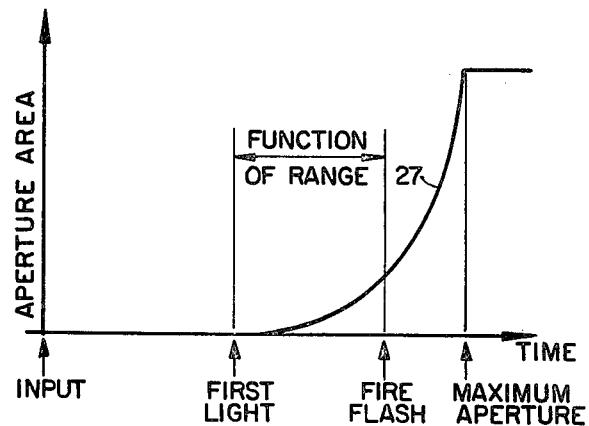
FIG. 7 is a graphical representation showing the change of effective aperture opening vs. time for the shutter blade mechanism of FIG. 3.

An alternative and preferred arrangement for determining the maximum effective aperture in correspondence with camera to photographic subject distance may be provided as follows. Referring now to FIG. 7, there is shown graphically a progressively increasing range of aperture values defined by the blade mechanism 14 as it is moved from its scene light blocking arrangement towards its maximum aperture defining value. When the artificial illumination is provided by an electronic flash device, the duration of flash fire power is extremely short in comparison to the time required for the blade mechanism 14 to move through its entire range of progressively increasing sized aperture values as shown in FIG. 7. Thus, under conditions of low ambient scene light, substantially the entire exposure occurs at the instant that the flash is fired so that the maximum effective aperture value for purposes of exposure is determined by the time that the flash is fired. Thus, the timing of the flash fire signal may be varied in correspondence with the camera-to-subject distance so as to establish a maximum effective aperture value in the aformentioned manner without physically intercepting or stopping the blade mechanism 14.

Figure 8:
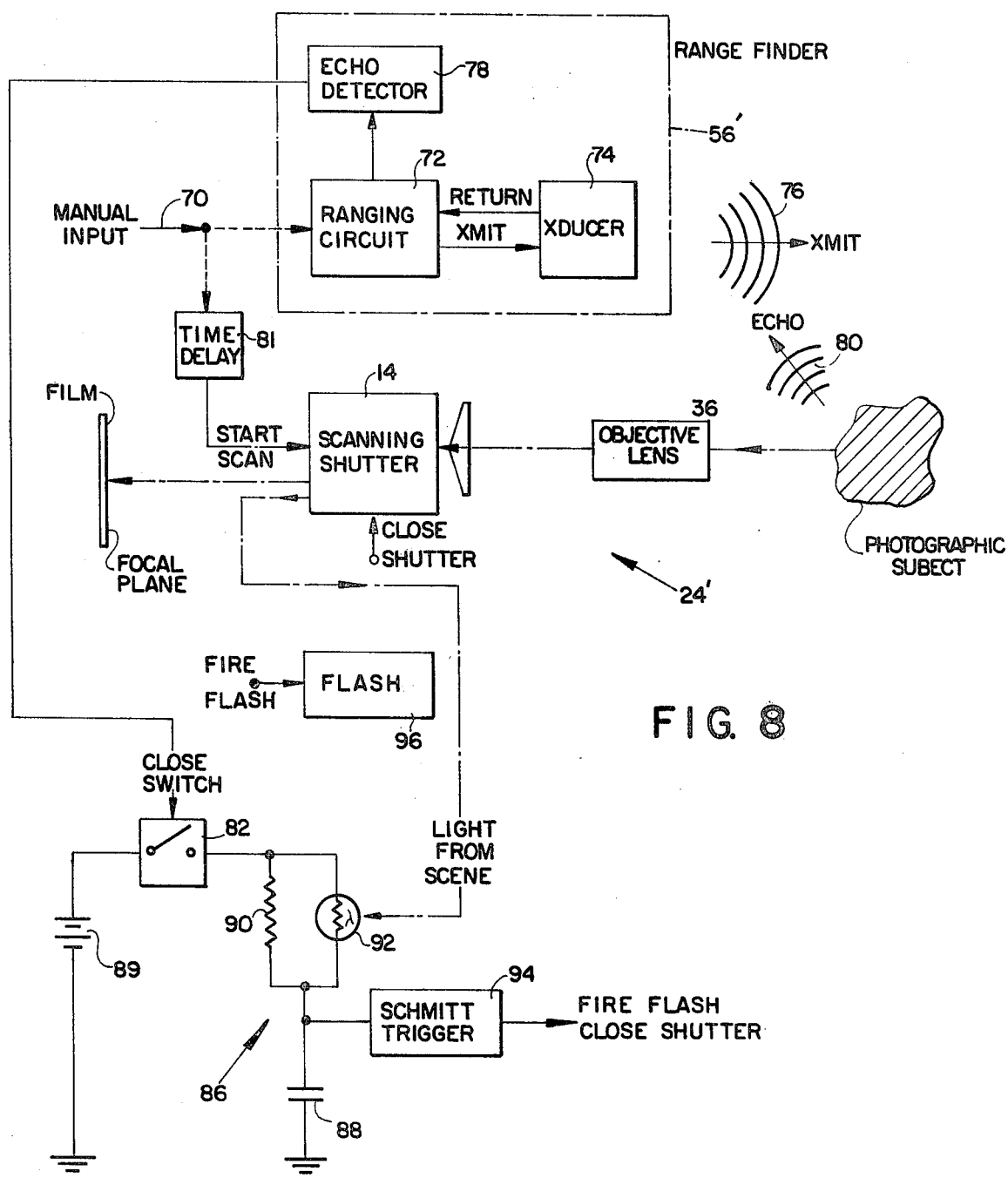
FIG. 8 is a schematic drawing showing a range responsive maximum effective aperture determining arrangement.

Toward this end, there is provided the arrangement of FIG. 8 wherein there is provided a ranging device 56' of the type disclosed in a co-pending U.S. Pat. application Ser. No. 840,802 filed Nov. 11, 1977 in common assignment herewith. Upon manual actuation of a photographic cycle initiating button 70, a ranging circuit 72 is actuated to issue a transmit commence signal through a sonic transducer 74 causing a burst of sonic energy 76 to be transmitted through the transducer. An echo detector 78 receives the returning echo signal 80 from a photographic subject and signals a switch 82 to close, applying power from a source of electrical energy 84 to a light integrating circuit as shown generally at 86. The light integrating circuit 86 comprises a capacitor 88 in series connection with resistor 90 with the positive terminal of the capacitor 88 connected to actuate a Schmitt trigger 94. There is also provided a photoresponsive element 92 in parallel connection with respect to the resistor 90 and physically stationed behind the photocell sweep secondary apertures 24 and 26 so as to receive light from the scene to be photographed in correspondence with the primary apertures. When the switch 82 is closed, the voltage of the input to the Schmitt trigger 94 begins to increase exponentially in accordance with the value of the capacitor 88 and the effective value of the resistance of the integrator which comprises the parallel combination of the resistor 90 and the photo-responsive element 92. When the voltage to the Schmitt trigger 94 reaches the required trigger level, the Schmitt 94 provides a signal for simultaneously firing an electronic flash 96 and energizing the solenoid 50 to drive the shutter blade mechanism 14 back to its scene light blocking arrangement as shown in FIG. 3.

Figure 9:
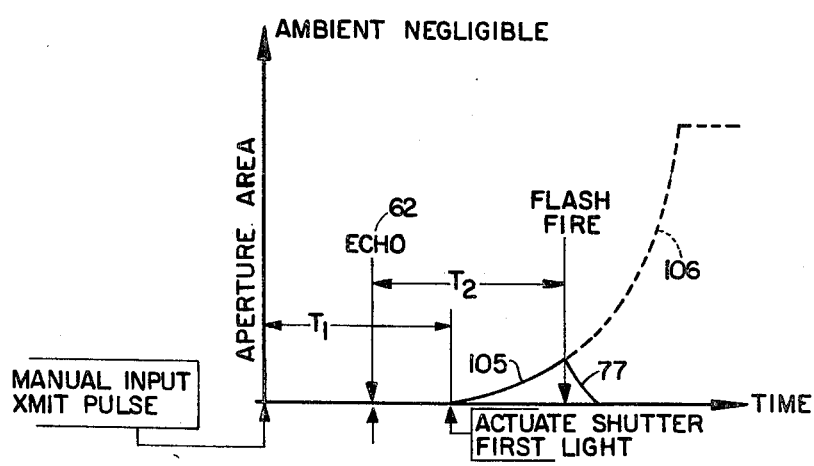
FIG. 9 is a graphical representation of the variation in maximum aperture vs. time for the arrangement of FIG. 8 during its ambient scene lighted mode of operation.

For conditions in which the ambient light is negligible, reference is made to FIG. 9 where curve 106 illustrates a possible variation in aperture value for the shutter mechanism 14 as a function of time. Manual actuation of the button 70 operates to initiate a photographic exposure cycle by releasing the blade mechanism 14 subsequent to a predetermined time delay $T_1$ as provided by the time delay circuit 81. The time delay $T_1$ at which the blade mechanism 14 is released must be at least equal to the time required for an echo signal to return from a photographic subject located at the maximum distance within the range of electronic flash 96. Thus, the switch 82 is closed prior to the initiation of the exposure or first light and the supply voltage is supplied for integrating circuit 86 in coincidence with receipt of the echo signal 80. However, since the ambient light is negligible, the resistance of the photodiode 92 will be high and the effective resistance integrating circuit 86 is essentially the resistance of the resistor 90 which is selected such that the trigger level of the Schmitt trigger 94 is reached after a time interval $T_2$. Consequently, the flash fire signal occurs after a predetermined time $T_2$ following receipt of the echo 80. When time $T_2$ is made equal to time $T_1$ it becomes readily apparent that the time that the flash 96 is fired subsequent to the initiation of the exposure cycle equals the time required for the echo signal to be transmitted and received thereby directly correlating the flash fire time during the exposure cycle to the camera-to-subject distance. As previously discussed, since the flash pulse is so narrow, the aperture value at the instant of flash firing becomes the maximum effective aperture value within the range of progressively increasing size apertures.

Figure 10:
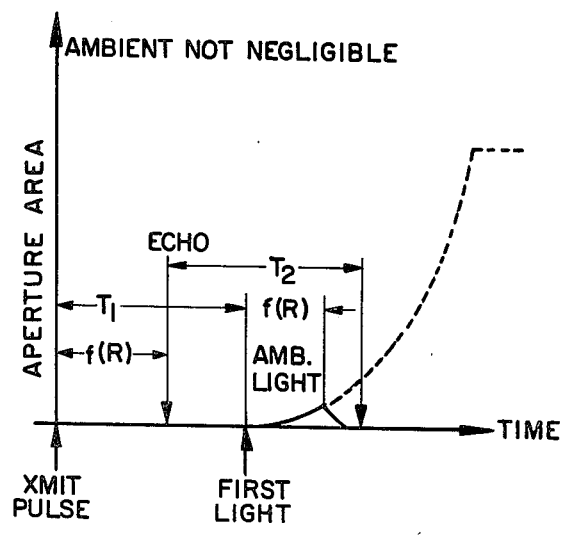
FIG. 10 is a graphical representation of the variation of maximum effective aperture vs. time for the arrangement in FIG. 8 during its operation without adequate ambient scene light.

In the event that the ambient scene light is not negligible, the photodiode 92 will contribute to the film exposure and shorten the time in which the flash pulse is fired in accordance with the ambient light as shown in FIG. 10. The aforementioned embodiment for determining a maximum effective aperture for firing an electronic flash at a time during the exposure cycle which is coordinated to the camera-to-subject distance is more particularly described in an U.S. Pat. application Ser. No. 898,546 entitled "Range Synchronized Flash Photographic Apparatus and Method for Achieving Flash Exposure", filed in common assignment herewith.

Since certain changes may be made in the above-described embodiment without departing from the scope of the invention herewith involved, it is intended that all matter contained in the above description as shown in the accompanying drawings interpreted as illustrative and not in a limiting sense.

What is claimed is:

1. In a camera including means for defining a focal plane and an effective aperture control arrangement operatively disposed with respect to said focal plane, the improvement comprising a lens arrangement operatively disposed with respect to said effective aperture control arrangement and fixedly positioned with respect to said focal plane during different exposure operations in which image-forming light rays from subjects, located at different specific locations within a given range of distances from said camera, are at different times respectively focused at said focal plane, said lens arrangement being configured to include a reverse spherical abberation corrective characteristic effective to substantially reduce the average size of the effective circles of confusion associated with each of the images of the different said subjects as formed at said focal plane by said lens arrangement in combination with said effective aperture control arrangement wherein said effective aperture control arrangement includes a shutter arrangement of the type capable of selectively providing different maximum effective aperture sizes during different exposure operations and means for varying the maximum effective aperture size for different exposure operations as a function of camera-to-subject distances so that the sizes of said maximum effective apertures increase as the camera-to-subject distances increases.

2. The improvement of claim 1 wherein said shutter arrangement comprises a scanning shutter arrangement in which moving shutter blades define changing aperture values during the exposure interval.

3. The invention of claim 2 wherein said camera includes means for mounting a source of artificial illumination and means for receiving a source of electrical power, the improvement comprising means for effecting the firing of the source of artificial illumination as a function of the subject-to-camera distance utilizing energy from the source of electrical power.

4. The improvement of claims 1, 2 or 3 wherein said effective aperture control arrangement and said lens arrangement comprises a substantially hyperfocal film exposure arrangement for all exposure operations associated with subjects located at different specific locations within said given range of distances from said camera such that each focused subject regardless of its position in said range resides at substantially one half hyperfocal distance from said camera at the forefront of the depth of field.

5. The improvement of claim 4 wherein said lens arrangement comprises an objective lens focused at near infinity and a lens element having a generally conical surface for providing said reverse spherical aberration corrective characteristic.

6. The improvement of claim 5 wherein at least one side of said lens element is structured and arranged to define an aspheric surface for correcting spherical aberrations.

7. The improvement of claim 6 wherein the other side of said lens element is structured and arranged to define a generally planar surface.

8. The improvement of claim 7 wherein said angle of said conical surface is approximately 3 minutes, 37 seconds with respect to said planar surface.

9. The improvement of claim 1 wherein said effective aperture control arrangement comprises a scanning shutter blade arrangement, in which moving shutter blades define changing aperture values during the exposure interval, an electronic flash device and means for automatically determining the distance from the lens arrangement to the photographic subject and for providing a trigger signal for firing said electronic flash device at an instant when said shutter blades define a select maximum effective aperture value corresponding to said determined distance during the movement of said blades to define changing aperture values.

10. The improvment of claim 9 wherein said distance determining means comprises a sonar ranging device.

11. In a camera including means for defining a focal plane, the improvement comprising a film exposure arrangement having a substantially hyperfocal characteristic for all exposure operations associated with subjects located at different distances from said camera within a given range of distances from said camera such that each focused subject regardless of its position in said range resides at substantially one half the hyperfocal distance from said camera at the forefront of the depth of field wherein said film exposure arrangement includes an objective lens arrangement at least fixedly positioned with respect to said focal plane during all of said exposure operations.

12. The improvement of claim 11 wherein said objective lens arrangement is configured to include a reverse spherical aberration corrective characteristic effective to substantially reduce the average size of the effective circles of confusion associated with each of the images as formed at said focal plane by said film exposure arrangement.

13. The improvement of claim 12 wherein said objective lens arrangement is focused at near infinity and said film exposure arrangement further includes a lens element having a generally conical surface for providing said reverse spherical aberration corrective characteristic.

14. The improvement of claims 11, 12 or 13 wherein said film exposure arrangement includes a shutter arrangement of the type capable of selectively providing different maximum effective aperture sizes during different exposure operations and means for varying the maximum effective aperture size for different exposure operations as a function of camera-to-subject distances so that the sizes of said maximum effective apertures increase as the camera-to-subject distance increases.

* * * * *

UNITED STATES PATENT AND TRADEMARK OFFICE
CERTIFICATE OF CORRECTION

PATENT NO. : 4,191,462
DATED : March 4, 1980
INVENTOR(S) : Bruce K. Johnson

It is certified that error appears in the above—identified patent and that said Letters Patent are hereby corrected as shown below:

Column 10, line 53, cancel "wherein" and insert the following --and further configuring--.

Column 10, line 54, cancel "includes" and insert the following --to include--.

Signed and Sealed this

First Day of July 1980

[SEAL]

Attest:

SIDNEY A. DIAMOND

Attesting Officer          Commissioner of Patents and Trademarks